United States Patent
Peacock

Patent Number: 5,996,047
Date of Patent: Nov. 30, 1999

[54] METHOD AND APPARATUS FOR CACHING FILE CONTROL INFORMATION CORRESPONDING TO A SECOND FILE BLOCK IN A FIRST FILE BLOCK

[75] Inventor: J. Kent Peacock, San Jose, Calif.

[73] Assignee: Sun Microsystems, Inc., Mountain View, Calif.

[21] Appl. No.: 08/673,958

[22] Filed: Jul. 1, 1996

[51] Int. Cl.$^6$ .................................................. G06F 12/08
[52] U.S. Cl. ............................................................. 711/118
[58] Field of Search .................................. 395/878, 842, 395/200.42, 200.49, 872, 551; 711/118, 117, 165; 710/22, 52, 58; 709/212, 219, 104, 105; 713/400; 707/2, 100, 205

[56] References Cited

U.S. PATENT DOCUMENTS

| | | | |
|---|---|---|---|
| 5,218,695 | 6/1993 | Noveck et al. ........................ | 707/205 |
| 5,276,840 | 1/1994 | Yu ............................................ | 395/872 |
| 5,355,453 | 10/1994 | Row et al. ........................... | 395/200.49 |
| 5,519,853 | 5/1996 | Moran et al. ........................ | 395/551 |
| 5,666,532 | 9/1997 | Saks et al. ........................... | 395/878 |
| 5,701,516 | 12/1997 | Cheng et al. ........................ | 395/842 |

*Primary Examiner*—Eddie P. Chan
*Assistant Examiner*—Gary J. Portka
*Attorney, Agent, or Firm*—Blakely Sokoloff Taylor & Zafman

[57] ABSTRACT

A method and system for managing control information associated with a file is disclosed. According to the method, a cache is established in a first file block for storing a second type of file control data. The cache has a cache range. In response to receiving a command to write the file, a first and second type of file control data is generated. The second type of file control data has a logical block number identifying a location in the second file block where the second type of file control data is to be stored. The first type of file control data is stored in the first file block. If the logical block number is within the cache range, then the second type of file control data is stored in the cache. If the logical block number is outside the cache range, then the cache is flushed by copying the previously stored second type of file control data in the cache to a second file block. The second type of file control data is then written into the cache.

16 Claims, 7 Drawing Sheets

METHOD AND APPARATUS FOR CACHING FILE CONTROL INFORMATION CORRESPONDING TO A SECOND FILE BLOCK IN A FIRST FILE BLOCK

FIELD OF THE INVENTION

The present invention pertains to the field of file systems. More specifically, the present invention relates to an apparatus and method for managing control information associated with a file.

BACKGROUND OF THE INVENTION

In a typical file system, caching file blocks in the volatile memory of a server when a file is written to the server poses a problem when the server crashes. The server is exposed to losing cached data during a reboot of the system. If the server had already reported the successful completion of the copy operation, the client would not know whether the data actually made it to persistent storage before the crash. Thus, many file systems require that data associated with write operations to be stored at a non-volatile storage location before the server can report successful completion of the write operation.

The Network File System (NFS) protocol, for example, requires that all operations that modify the filesystem be synchronously written to non-volatile storage before the completion of the write operation is acknowledged. Because of the relative slowness of disk operations, NFS write operations incur an undesirable amount of delay. A synchronous write typically requires at least two disk writes: one for the new data for a file and one for the control information associated with the file. In UNIX, updating the control information includes changing the file size indicated in the inode associated with the file, and storing data indicating the blocks where the new file data is stored ("file block pointers"). For a file larger than 12 data blocks, an additional disk write is required to write the file block pointers to an indirect index block located separate from the inode.

In NFS, file transfer rates are greatly affected by the disk seek time (the time to move the arm containing a read/write head to the desired track on the disk). Since data blocks containing new file data, inodes containing file information, and indirect index blocks containing data block pointers are located at different areas of the disk, additional time is required for the synchronous write when an additional disk write is required to write the file block pointers to an indirect index block. This delay severely restricts the write throughput available from a given server.

Thus, what is needed is an apparatus and method for reducing the number of disk I/O operations required to perform writes without sacrificing the safeguards provided by the requirement that completion of a synchronous write operation cannot be acknowledged until the data is stored on non-volatile storage.

SUMMARY OF THE INVENTION

The present invention provides a method of writing a first and second type of file control data into a non-volatile storage. During the write operation, the first type of file control data is written to a first block, and the second type of file control data that is typically written separately to a second file block in the non-volatile storage is cached in the first block. By combining the two types of file control data into one disk block, one I/O operation is saved per write. When a cache miss occurs, the second type of file control data in the cache is written in a single I/O operation from the first file block into the second file block. Consequently, the time investment required in accessing the second file block is maximized and the number of I/O operations to the non-volatile storage is reduced.

According to one aspect of the invention, a method is described for managing control information associated with a file. According to the method, a cache is established in a first file block for storing a second type of file control data. The cache has a cache range. In response to receiving a command to write the file, a first and second type file control data is generated. The second type of file control data has a logical block number identifying a location in a second file block where the second type of file control data is to be stored. The first type of file control data is stored in the first file block. If the logical block number of the file is within the cache range, then the second type of file control data is stored in the cache. If the logical block number of the file is outside the cache range, then the cache is flushed by copying the previously stored second type of file control data in the cache to a second file block. The cache range is reconfigured to include the logical block number and the second type of file control data is then written to the cache.

According to one embodiment, data that identifies the second file block and data that identifies a section of the second file block into which contents of the cache are to be copied are stored in the first file block. Data that identifies the section of the second block into which contents of the cache are to be copied to is updated after the step of flushing.

According to another aspect of the invention, a method is described for managing control information associated with a file. According to the method a command to write the file is received. A first and second type of file control data is generated in response to receiving the command. The first type of file control data is written into an inode for the file. A section of a current indirect block is cached in the same file block that contains the inode of the file. The second type of file control data is stored in the cache.

BRIEF DESCRIPTION OF THE DRAWINGS

The present invention is illustrated by way of example and not by way of limitation in the figures of the accompanying drawings, in which like references indicate similar elements and in which.

DETAILED DESCRIPTION

A method and apparatus for managing control information associated with a file is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 1:
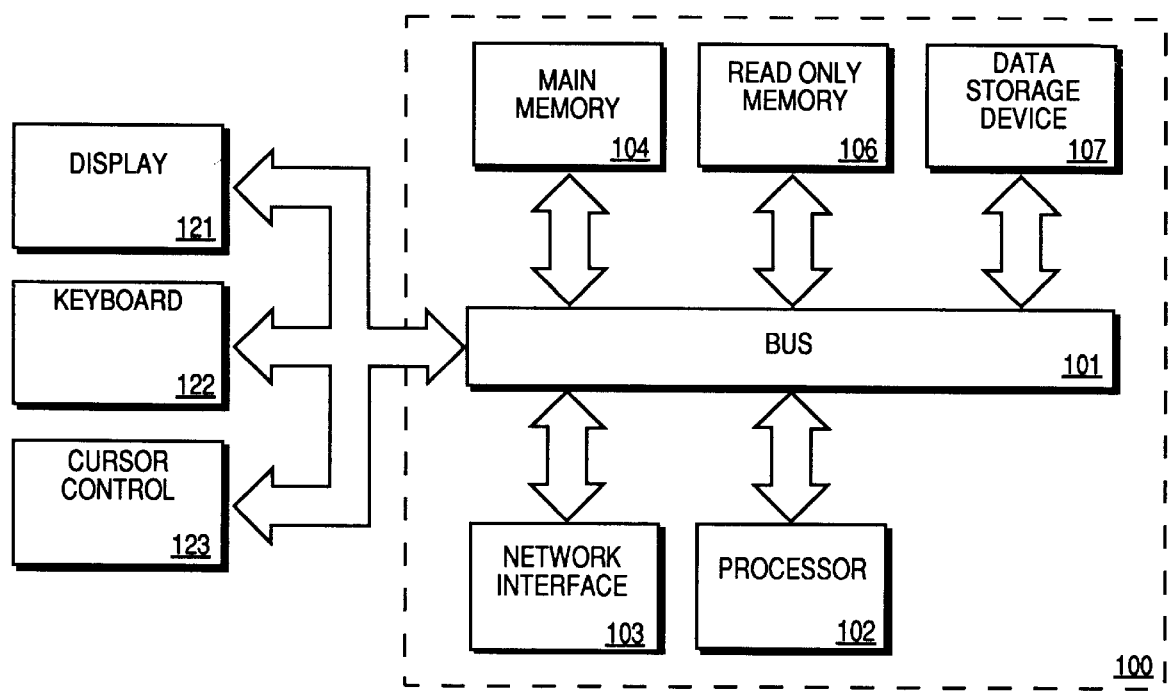
FIG. 1 illustrates a block diagram of a system which may be programmed to implement the present invention.

Referring to FIG. 1, the computer system upon which an embodiment of the present invention can be implemented is shown as 100. Computer system 100 comprises a bus or other communication device 101 that communicates information, and a processor 102 coupled with bus 101 that processes information. System 100 further comprises a random access memory (RAM) or other dynamic storage device 104 (referred to as main memory), coupled to bus 101 that stores information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 that stores static information and instructions for processor 102. Data storage device 107 is coupled to bus 101 and stores information and instructions. A data storage device 107 such as a magnetic disk or optical disk and its corresponding disk drive can be coupled to computer system 100. Network interface 103 is coupled to bus 101. Network interface 103 operates to connect computer system 100 to a network of computer systems (not shown).

Computer system 100 can also be coupled via bus 101 to a display device 121, such as a cathode ray tube (CRT), for displaying information to a computer user. An alphanumeric input device 122, including alphanumeric and other keys, is typically coupled to bus 101 for communicating information and command selections to processor 102. Another type of user input device is cursor control 123, such as a mouse, a trackball, or cursor direction keys for communicating direction information and command selections to processor 102 and for controlling cursor movement on display 121. This input device typically has two degrees of freedom in two axes, a first axis (e.g., x) and a second axis (e.g., y), which allows the device to specify positions in a plane.

Alternatively, other input devices such as a stylus or pen can be used to interact with the display. A displayed object on a computer screen can be selected by using a stylus or pen to touch the displayed object. The computer detects the selection by implementing a touch sensitive screen. Similarly, a light pen and a light sensitive screen can be used for selecting a displayed object. Such devices may thus detect selection position and the selection as a single operation instead of the "point and click," as in a system incorporating a mouse or trackball. Stylus and pen based input devices as well as touch and light sensitive screens are well known in the art. Such a system may also lack a keyboard such as 122 wherein all interface is provided via the stylus as a writing instrument (like a pen) and the written text is interpreted using optical character recognition (OCR) techniques.

The present invention is related to the use of computer system 100 to manage file control information. According to one embodiment, management of file control information is performed by computer system 100 in response to processor 102 executing sequences of instructions contained in memory 104. Such instructions may be read into memory 104 from another computer-readable medium, such as data storage device 107. Execution of the sequences of instructions contained in memory 104 causes processor 102 to manage file control information, as will be described hereafter. In alternative embodiments, hard-wired circuitry may be used in place of or in combination with software instructions to implement the present invention. Thus, the present invention is not limited to any specific combination of hardware circuitry and software.

File Control Data Management

Figure 2:
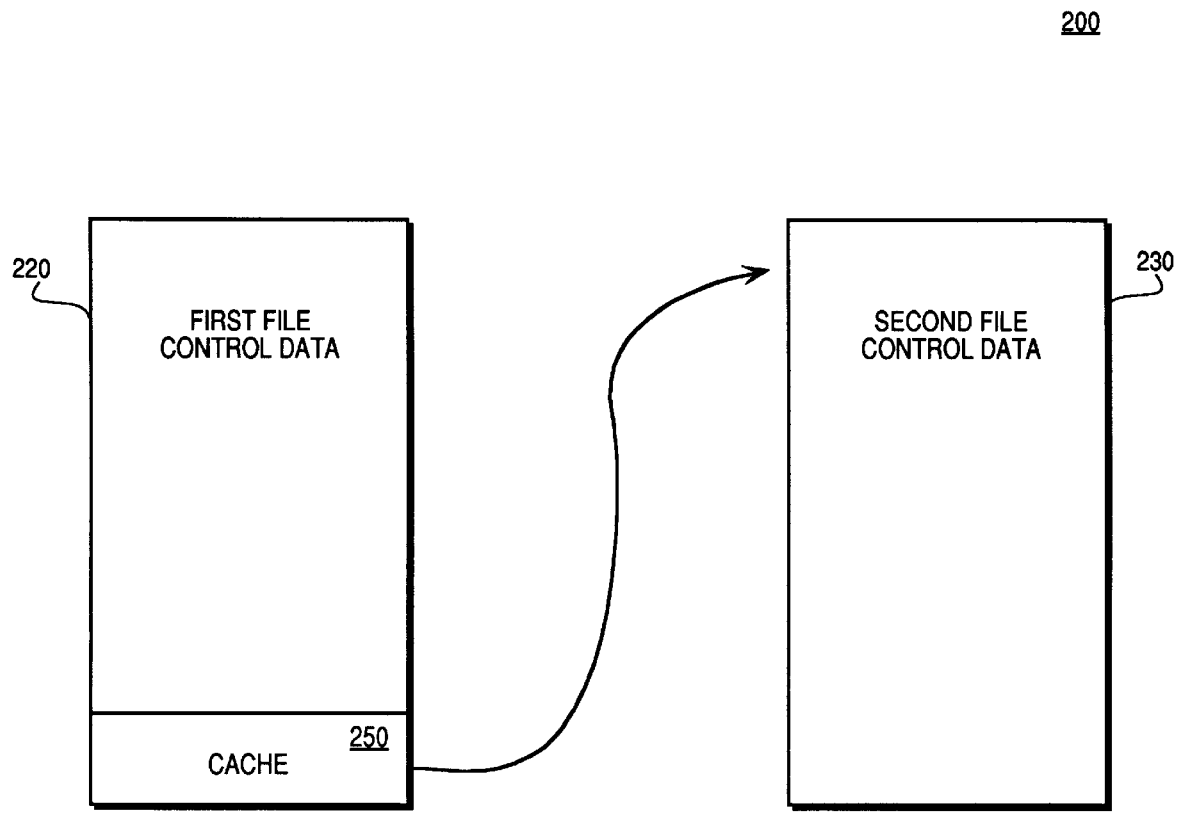
FIG. 2 illustrates a block diagram of a block mapping cache according to one embodiment of the present invention.

Techniques for writing file control data into a non-volatile storage shall be described with reference to FIG. 2. FIG. 2 illustrates a block mapping cache according to one embodiment of the present invention. Block 220 represents a first file block that stores a first type of file control data. Block 230 represents a second file block that stores a second type of file control data. Typically, whenever the first type of file control data is generated and is required to be stored in non-volatile storage 200 the second type of file control data is also generated and is also required to be stored in non-volatile storage 200. A logical block number identifies a location in the second file block where the second type of file control data is stored. First file block 220 and second file block 230 reside in different locations in non-volatile storage 200. When data is written into first file block 220 and second file block 230, two separate input/output (I/O) operations are required.

Cache 250 resides in first file block 220. Cache 250 has a cache range defined by a first logical block number of the second file block 230 and a predetermined number of cache addresses in the cache. The first logical block number is a previously received logical block number defined as the first location in second file block 230 to be mapped by cache 250. Cache 250 is configured to store a plurality of entries of the second type of file control data. When there is a cache hit, the second type of file control data is written into cache 250 instead of directly into second file block 230. A cache hit occurs when a current line block number identifying a location where a second type of file control data is to be stored in the second file block 230 is within the cache range. Since cache 250 resides in first file block 220, writing the second type of file control data into cache 250 can be done in the same I/O operation as is used to write the first type of file control data into first file block 220.

When there is a cache miss, cache 250 is flushed by copying the contents of cache 250 into second file block 230 in a single separate I/O operation. A cache miss occurs when a current line block number identifying a location where a second type of file control data is to be stored in the second file block 230 is outside the cache range. By writing a plurality of entries of the second type of file control data into cache 250 and copying the contents of cache 250 when cache 250 is full or when there is a cache miss using only a single I/O operation, the time required to store the first and second type of file control data into non-volatile storage 200 is significantly reduced.

Inodes

Figure 3:
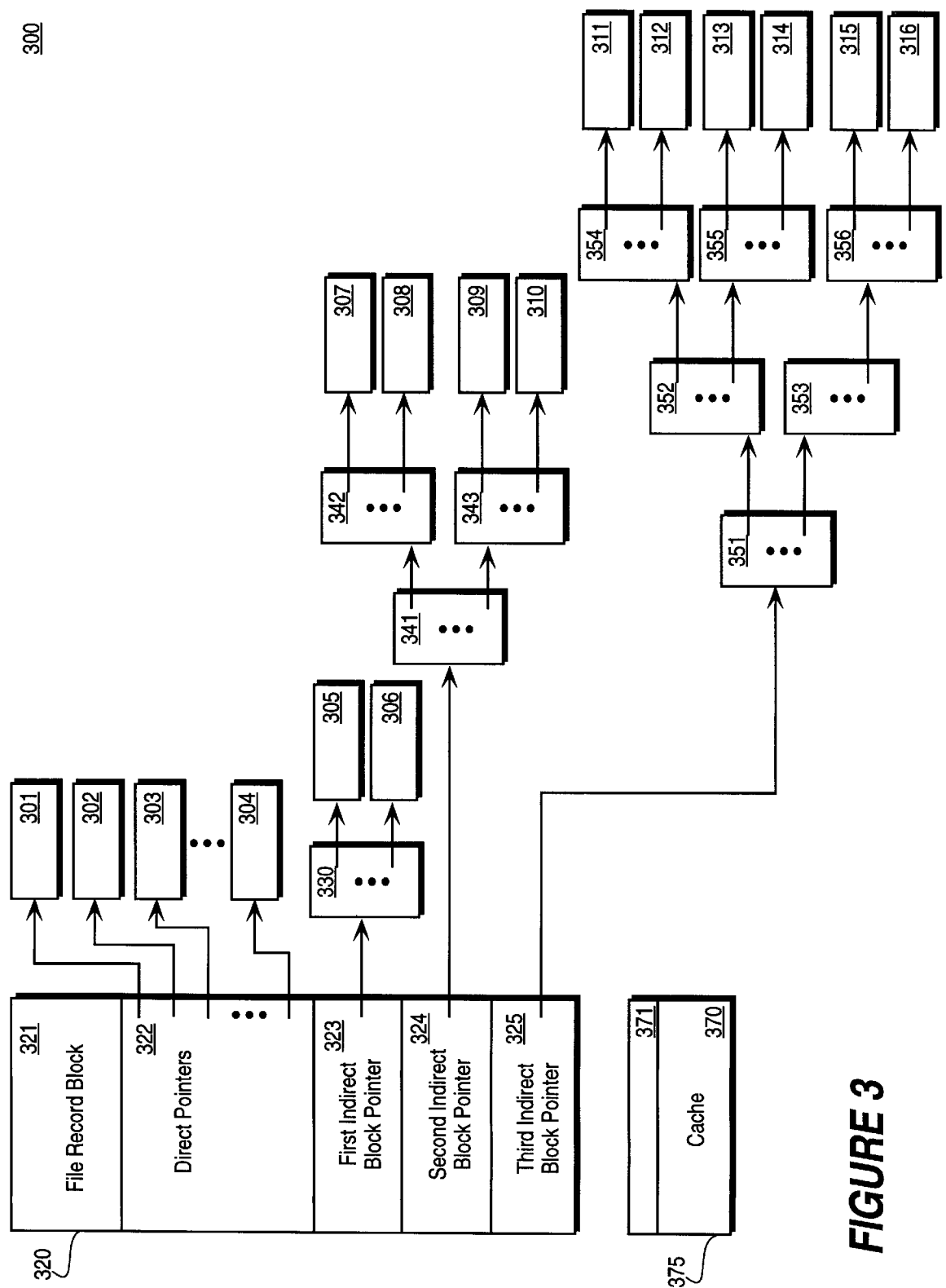
FIG. 3 illustrates a UNIX file system block mapping cache according to one embodiment of the present invention.

FIG. 3 illustrates a non-volatile storage location 300 containing data structures which are created or updated during a file write operation. Data blocks 301–316 contain file data for a particular file. Block 320 represents an inode corresponding to the file to which data blocks 301–316 belong. Inode 320 is a data structure used by the UNIX filesystem to describe the file. File record block 321 of inode 320 contains information regarding the type and access mode for the file, the file's owner, the group-access identifier, the time the file was most recently read and written, the time the inode was most recently updated by the system, the size of the file, the number of physical blocks used by the file, the number of references to the file, flags that describe characteristics of the file, and the generation number of the file. Information in file record block 321 is updated each time the file associated with inode 320 is modified.

Inode 320 contains an array of 15 pointers that are used to identify the disk blocks that contain the data contents of the file associated with inode 320. Direct pointers 322 make up the first 12 of these pointers. Direct pointers 322 contain the addresses of data blocks 301–304 that contain data of the file. In one embodiment, a logical block number of the block containing data for the file is converted to a physical sector number by indexing into the array using the logical block number. A null array entry shows that no block has been allocated and will cause a block of zeros to be returned on a read.

When new data is added to the file associated with inode 320, a new block is allocated, an array entry is updated with the new block number, and the data are written to the new block. If the block size is 4K, then up to 48K of data may be accessed using the direct pointers 322 of the inode 320. Thus, a write operation for a data block that can be indicated by one of the direct pointers 322 requires two disk writes: one for the new data and one to update the information in the inode.

Indirect Blocks

The next three pointers in inode 320 point to indirect blocks. Indirect blocks are used to store file block pointers used to store file block pointers to additional file blocks once direct pointers 322 have all been used. The first indirect block pointer 323 contains the address of a single indirect block 330. The single indirect block 330 is an index block, containing not data, but rather the addresses of data blocks 305 and 306 that do contain data.

For files that are larger than a few megabytes, the storage within the single indirect block is eventually exhausted. These files must resort to using a double indirect block. The second indirect block pointer 324 contains the address of a block 341 that contains addresses to indirect blocks 342 and 343 that are index blocks that contain pointers to actual data blocks 307–310.

For files of multiple gigabytes, a triple indirect block, which contains three levels of indirection before reaching the data block is used. The third indirect block pointer 325 contains the address of a block 351 that contains addresses of blocks 352 and 353 that contain addresses of indirect blocks 354, 355, and 356 that are index blocks that contain pointers to actual data blocks 311–316. Thus, a write operation for a data block that must be identified using an indirect pointer requires three disk writes: one for the new data, one for the inode to update file information, and one to the indirect block to add a new data pointer.

Using conventional techniques, an indirect block must be updated every time data is added to the file associated with inode 320 once the direct pointers 322 have been used. Typically, data block pointers are added to an indirect block in a sequential manner. When an indirect block becomes full, a new indirect block is allocated. The indirect block to which the next data block pointer is to be written is referred to as the current indirect block.

Unix File System Block Mapping Cache

A cache 370 resides in the same file block that contains inode 320. In one embodiment of the present invention, cache 370 resides outside inode 320 in an inode extension 375. The inode extension 375 fits in a regular inode slot and looks like an unallocated inode. The binding of the inode extension 375 to inode 320 is accomplished implicitly by including a reference to the main inode's number in the inode extension 375. In an alternate embodiment of the present invention, cache 370 resides inside inode 320 in unused space. Thus, the inode extension 375 only needs to be allocated for a file if the file grows beyond the size mapped by the direct blocks.

Cache 370 is configured to store a plurality of pointers or addresses of data blocks. During write operations, when data is written to the end of a file to extend the file, the data is written to a data block and a pointer to the new data block is placed into cache 370, rather than into the current indirect block. Cache 370 allows combining the step of writing a file block pointer with the step of updating the inode into a single disk write. Thus, inode and block mapping information may be updated atomically in one disk operation, rather than the two write operations normally required in prior art systems.

The data that is written into cache 370 is flushed by copying the data to the current indirect block. Information that identifies the location of the current indirect block and the location within the current indirect block into which the cached data is to be written is stored in a cache record block 371. In one embodiment of the present invention, information that identifies the location of the current indirect block is assigned the variable IB which stands for indirect block. Information that identifies the location within the current indirect block into which the cached data is to be written and where cache mapping begins in the current indirect block is assigned the variable firstLBN for first logical block number. Cache 370 maps blocks of data between the locations indicated by firstLBN and the number of cache addresses (NCADDR) in cache 370. Cache record block 371 also resides in the same file block that contains inode 320. The information that identifies the portion of the current indirect block that is being cached is updated after cache 370 is flushed. The data that identifies the location of the current indirect block is updated after a current indirect block is full and a new indirect block is allocated.

Each time a command to write a file is received, a logical block number (LBN) identifying the location within the current indirect block into which the cached data is to be written is also received. The range of cache 370 is defined by the range firstLBN+NCADDR−1. When a logical block number of data to be written is outside the cache range, a cache miss occurs and the cache 370 is flushed. In addition to flushing cache 370 when there is a cache miss, there may be other situations when cache 370 is flushed. Cache 370 is flushed when a last data block in the file is written to non-volatile storage 300, or when the non-volatile storage 300 is to be removed from the computer system 100 (shown in FIG. 1).

Cache record block 371 contains two flags which indicate the states of cache 370 and the current indirect block. A "modify" flag indicates whether cache 370 contains information that has not yet been copied to the current indirect block. The modify flag is set to true when new pointers are written to cache 370. The modify flag is set to false when cache 370 is flushed.

An "uninitialized" flag indicates whether or not a current indirect block has been initialized. In prior art systems, before a current indirect block is written to, the current indirect block is initialized to clear out previously written data. The initialization step, however, was a procedure which required a disk write. As stated above, additional disk writes produce undesirable delays. The uninitialized flag allows the initialization process to be deferred to a convenient time when the initialization step can be combined with a write to the current indirect block. By setting the uninitialized field to true when a new current indirect block is allocated, the computer system 100 (shown in FIG. 1) is informed that the new current indirect block contains old data. During a next write to the current indirect block, the computer system 100 initializes the current indirect block before writing to the indirect block and sets the uninitialized field to false.

MANAGING CONTROL INFORMATION

Figure 4:
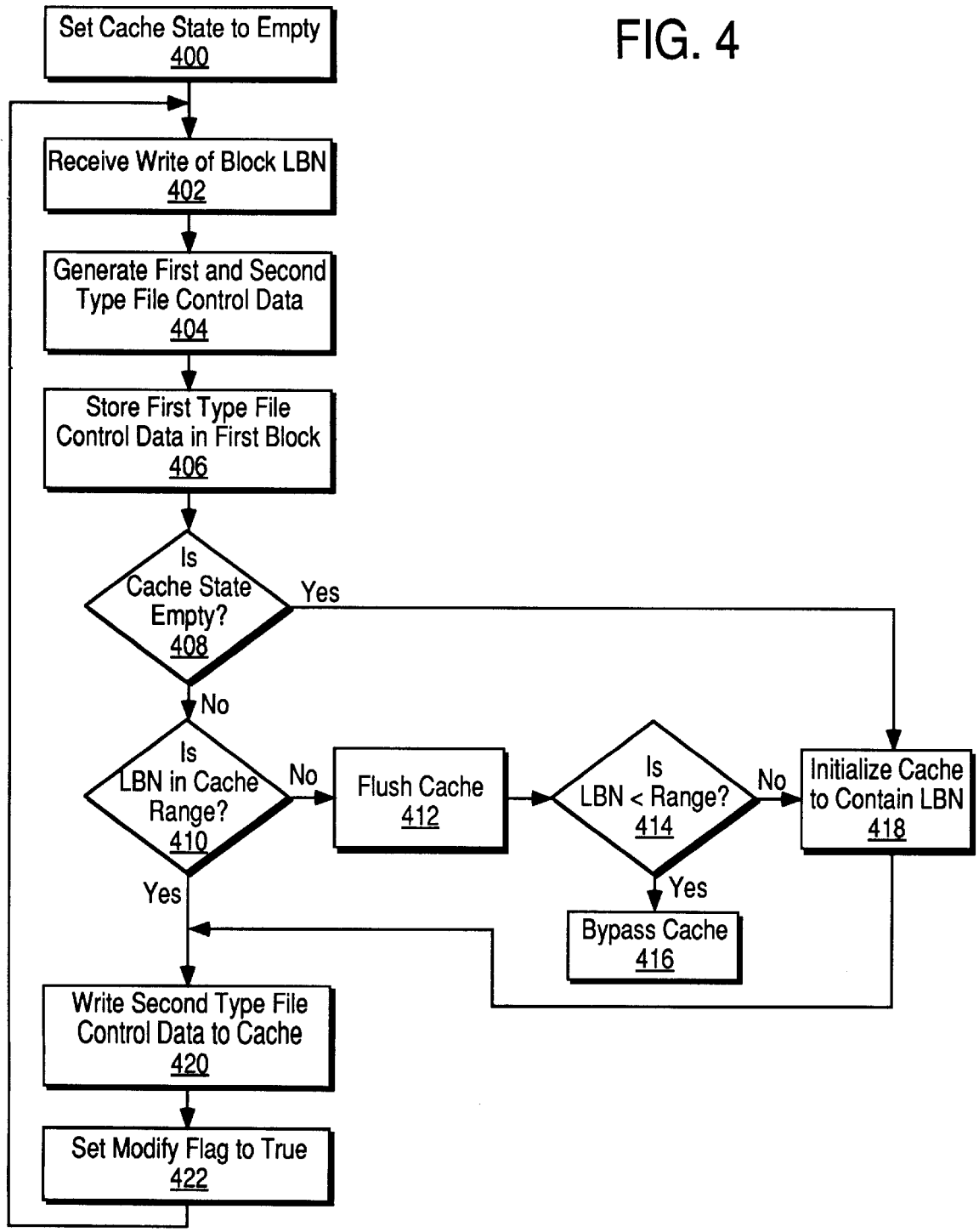
FIG. 4 is a flow chart illustrating a method for managing control information associated with a file.

FIG. 4 is a flow chart illustrating a method of managing control information associated with a file. At step 400, a cache is configured and the cache state is set to empty. The cache is configured to temporarily store a plurality of entries that correspond to a second type of file control data. The plurality of entries will be copied from the cache to the current indirect block during a single separate write operation. By copying the cached entries to the current indirect block in a single write operation, the time investment required in accessing the current indirect block is maximized.

At step 402, a command to write data to the file is received. A logical block number (LBN) identifying the location within the current indirect block into which data is to be written is received.

At step 404, first and second type of file control data is generated in response to receiving the command to write.

At step 406, the first file control data is stored in the first block.

At step 408, it is determined whether the cache state is empty. If the cache state is not empty, control proceeds to step 410. If the cache state is empty, control proceeds to step 418.

At step 410, it is determined whether the LBN is in the cache range. The cache maps blocks between the firstLBN and firstLBN+NCADDR−1. If the LBN is not in the cache range, control proceeds to step 412. If the LBN is in the cache range, control proceeds to step 420.

At step 412, the cache is flushed.

At step 414, it is determined whether the LBN is lower than the cache range. Detecting a LBN that is below the cache range is a heuristic that detects when a random access may be occurring. Random writes involve a LBN sequence which do not increase by one each time and are likely to cause a cache miss. If the LBN is not below the cache range, control proceeds to step 418. If the LBN is below the cache range, control proceeds to step 416.

At step 416, writing to the cache is bypassed. The cache is disabled in cases when a random access may be occurring.

At step 418, the cache is initialized to contain the LBN and a new cache range is configured where LBN is the firstLBN.

At step 420, the second type of file control data is written to the cache.

At step 422, the modify flag is set to true. Control proceeds to step 402.

Figure 5:
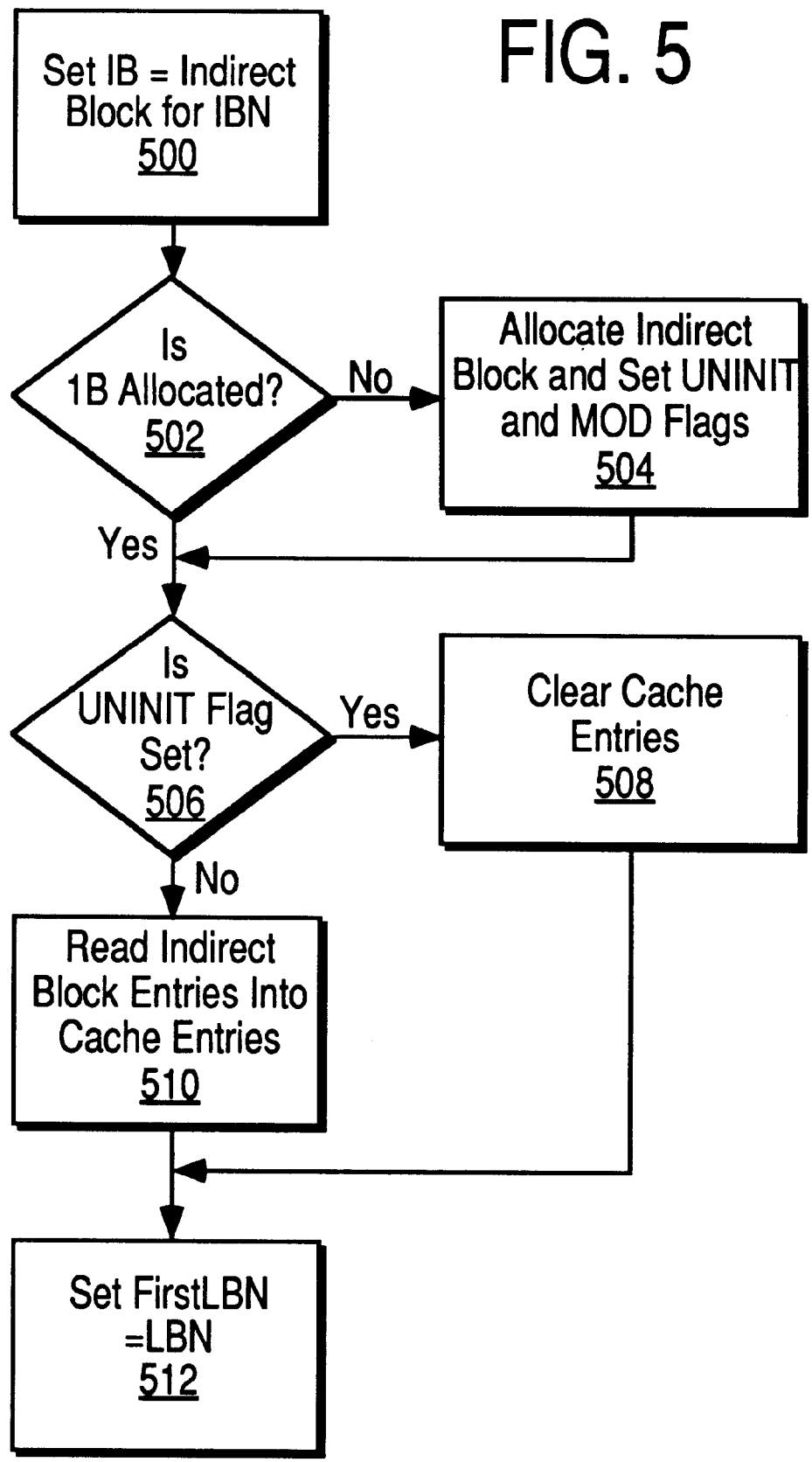
FIG. 5 is a flow chart illustrating a method for initializing a cache to contain a logical block number.

FIG. 5 is a flow chart illustrating a method of initializing a cache to contain a logical block number (LBN). At step 500, a variable IB is set equal to the value of the indirect block for the LBN.

At step 502, it is determined whether the variable IB is allocated. If the variable IB is not allocated, control proceeds to step 504. If the variable IB is allocated, control proceeds to step 506.

At step 504, the indirect block is allocated and the uninitialized and modify flags are set to true.

At step 506, it is determined whether the uninitialized flag is set. If the uninitialized flag is set, control proceeds to step 508. If the uninitialized flag is not set, control proceeds to step 510.

At step 508, the cache entries are cleared by setting all cache entries to zero.

At step 510, the indirect block entries for the LBN are read into the cache entries. The entries for LBN to the cache size are read into the cache.

At step 512, the first logical block number (firstLBN) is set to the LBN.

Figure 6:
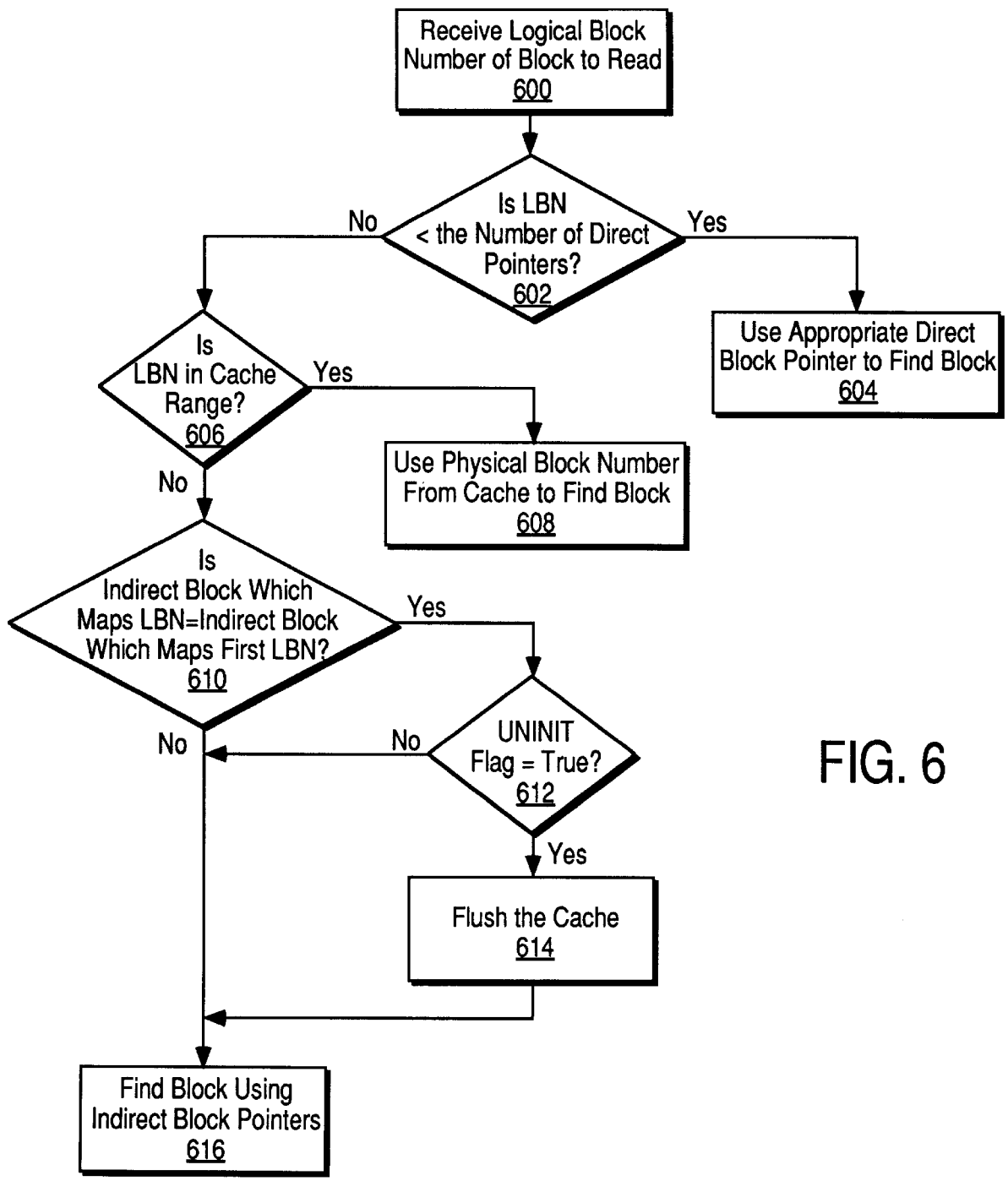
FIG. 6 is a flow chart illustrating a method of reading a block of data to a file in a system that uses a cache.

FIG. 6 is a flow chart illustrating a method of reading a block of data in a file of a system that uses a cache. At step 600, a logical block number (LBN) of a block to be read is received.

At step 602, it is determined whether the LBN is less than the number of direct pointers. If the LBN is less than the number of direct pointers, then control proceeds to step 604. If the LBN is greater than the number of direct pointers, then control proceeds to step 606.

At step 604, the appropriate direct block pointer is used to find the block.

At step 606, it is determined whether the LBN is in the cache range. The cache range is defined to be the range between the first logical block number (firsLBN) and the firstLBN plus the next cache address minus one (NCADDR−1). If the LBN is in the cache range, control proceeds to step 608. If the LBN is not in the cache range, control proceeds to step 610.

At step 608, the physical block number from the cache is used to find the block.

At step 610, it is determined whether the indirect block which maps the logical block number is the same as the indirect block which maps the firstLBN. If the indirect block is the same, control proceeds to step 612. If the indirect block is different, control proceeds to step 616.

At step 612, it is determined whether the uninitialized flag is set to true. If the uninitialized flag is set to true, control proceeds to step 614. If the uninitialized flag is set to false, control proceeds to step 616.

At step 614, the cache is flushed.

At step 616, the indirect block pointers are used to find the block.

Figure 7:
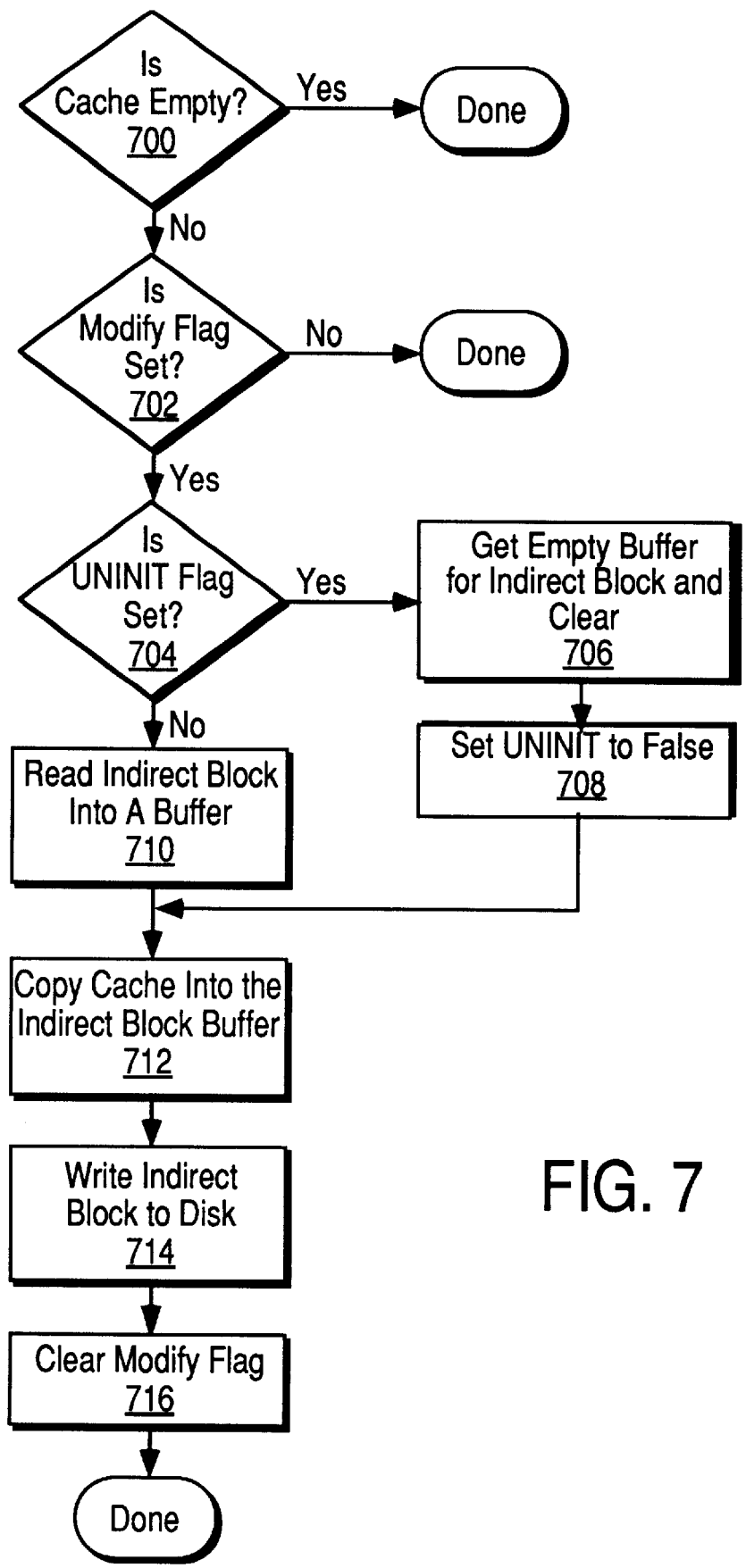
FIG. 7 is a flow chart illustrating a method of flushing a cache.

FIG. 7 is a flow chart illustrating a method of flushing a cache. At step 700, it is determined whether the cache is empty. The cache is empty when the variable firstLBN is set to zero. If the cache is empty, the method is completed. If the cache is not empty, control proceeds to step 702.

At step 702, it is determined whether the modify flag is set. If the modify flag is not set, the method is completed. If the modify flag is set, control proceeds to step 704.

At step 704, it is determined whether the uninitialized flag is set. If the uninitialized flag is set, control proceeds to step 706. If the uninitialized flag is not set, control proceeds to step 710.

At step 706, an empty buffer is selected for the indirect block and the indirect block is cleared by setting all the entries in the indirect block to zero.

At step 708, the uninitialized flag is set to false.

At step 710, the indirect block is read into the buffer.

At step 712, the cache is copied into the indirect block buffer.

At step 714, the indirect block is written to disk.

At step 716, the modify flag is cleared.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of managing control information associated with a file, the method comprising the steps of:

establishing in a first file block a cache having a cache range;

in response to receiving a command to write the file, performing the steps of generating a first and second type of file control data, the second type of file control data having a logical block number identifying a location in a second file block where the second type of file control data is to be stored;

storing the first type of file control data in the first file block;

if the logical block number is within the cache range, then storing only the second type of file control data in the cache;

if the logical block number is outside the cache range, then flushing the cache by copying only previously stored second type of file control data in the cache to the second file block.

2. The method of claim 1 further comprising the step of reconfiguring the cache range to include the logical block number when the logical block number is outside the cache range.

3. The method of claim 2 further comprising the step of writing the second type of file control data into the cache when the logical block number is outside the cache range.

4. The method of claim 1 further comprising the step of storing in the first file block data that identifies the second file block.

5. The method of claim 1 further comprising the step of storing in the first file block an indicator indicating that the cache contains information to be copied to the second file block after the second type of file control data is stored in the cache when the logical block number is within the cache range.

6. The method of claim 1 further comprising the step of storing in the first file block an indicator indicating that the cache does not contain information to be copied to the second file block after the step of flushing when the logical block number is outside the cache range.

7. A computer-readable medium having stored thereon sequences of instructions, the sequences of instructions including instructions which, when executed by a processor, causes the processor to perform the steps of:

establishing in a first file block a cache having a cache range;

in response to receiving a command to write the file, performing the steps of generating a first and second type of file control data, the second type of file control data having a logical block number identifying a location in a second file block where the second type of file control data is to be stored;

storing the first type of file control data in the first file block;

if the logical block number is within the cache range, then storing only the second type of file control data in the cache;

if the logical block number is outside the cache range, then flushing the cache by copying only the previously stored second type of file control data in the cache to the second file block.

8. The computer-readable medium of claim 7 further comprising instructions which, when executed by the processor, would cause the processor to perform the step of reconfiguring the cache range to include the logical block number when the logical block number is outside the cache range.

9. The computer-readable medium of claim 8 further comprising instructions which, when executed by the processor, would cause the processor to perform the step of writing the second type of file control data in the cache when the logical block number is outside the cache range.

10. The computer-readable medium of claim 7 further comprising instructions which, when executed by the processor, would cause the processor to perform the step of storing in the first file block data that identifies the second file block.

11. The computer-readable medium of claim 7 further comprising instructions which, when executed by the processor, would cause the processor to perform the step of storing in the first file block an indicator indicating that the cache contains information to be copied to the second file block after the second type of file control data is stored in the cache when the logical block number is within the cache range.

12. The computer-readable medium of claim 7 further comprising instructions which, when executed by the processor, would cause the processor to perform the step of storing in the first file block an indicator indicating that the cache does not contain information to be copied to the second file block after the step of flushing if the logical block number is outside the cache range.

13. A method of managing control information associated with a file, the method, performed in response to receipt of a command to write the file, comprising the steps of:

generating and storing a first type of file control data in a first file block, the first file block having a cache with a cache range;

generating a second type of file control data, the second type of file control data having a logical block number identifying a location in a second file block where the second type of file block is to be stored;

storing the second type of file control data in the cache, if the logical block number is within the cache range;

flushing the cache by copying previously stored second type of file control data in the cache to the second file block, if the logical block number is outside the cache range.

14. A computer system comprising:

a bus;

a processor coupled to the bus;

a storage device coupled to the bus, the storage device including a first file block associated with a file, the first file block storing a first type of file control data and having a cache for temporarily storing a second type of file control data; and a second file block associated with the file, the second file block receiving the second type of file control data when the cache is flushed.

15. The computer system of claim 14 wherein the first file block further comprises a cache record block that stores data that identifies the second file block.

16. The computer system of claim 15 wherein the first file block further comprises a cache record block that stores data that identifies a section of the second file block into which contents of the cache are copied to.

* * * * *